United States Patent
Koelle et al.

(10) Patent No.: US 8,450,424 B2
(45) Date of Patent: May 28, 2013

(54) SULFUR-CROSSLINKABLE RUBBER MIXTURE

(75) Inventors: Philipp Koelle, Hannover (DE); Christoph Jocher, Bad Saarou (DE); Thomas Kramer, Herford (DE); Fabian Dettmer, Braunschweig (DE); Thorsten Torbruegge, Langenhagen (DE); Carla Recker, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 13/557,924

(22) Filed: Jul. 25, 2012

(65) Prior Publication Data

US 2012/0289647 A1    Nov. 15, 2012

Related U.S. Application Data

(63) Continuation of application No. PCT/EP2010/069438, filed on Dec. 13, 2010.

(30) Foreign Application Priority Data

Feb. 17, 2010  (EP) ..................................... 10153826

(51) Int. Cl.
*C08F 8/00* (2006.01)
*C08F 36/00* (2006.01)
*C08F 12/02* (2006.01)
*C08J 3/22* (2006.01)

(52) U.S. Cl.
USPC ............................ 525/192; 525/194; 524/525

(58) Field of Classification Search
USPC ................... 525/192, 194; 524/525; 526/335, 526/346
See application file for complete search history.

(56) References Cited

U.S. PATENT DOCUMENTS

| | | |
|---|---|---|
| 4,714,732 A | 12/1987 | Hoshino |
| 6,121,392 A | 9/2000 | Thompson |
| 6,136,943 A | 10/2000 | Kawashima et al. |
| 7,084,228 B2 | 8/2006 | Labauze et al. |
| 7,968,633 B2 | 6/2011 | York et al. |
| 7,968,634 B2 | 6/2011 | York et al. |
| 7,968,635 B2 | 6/2011 | York et al. |
| 7,968,636 B2 | 6/2011 | York et al. |
| 2004/0092644 A1 | 5/2004 | Labauze |
| 2004/0122157 A1 | 6/2004 | Labauze |
| 2007/0161735 A1 | 7/2007 | Bergman |
| 2009/0000711 A1* | 1/2009 | Strubel et al. .............. 152/209.1 |

FOREIGN PATENT DOCUMENTS

| | | |
|---|---|---|
| EP | 2 098 564 A1 | 9/2009 |
| EP | 2 105 462 A1 | 9/2009 |
| WO | WO 99/09036 A1 | 2/1999 |

OTHER PUBLICATIONS

International Search Report dated Feb. 28, 2011 of international application PCT/EP 2010/069438 on which this application is based.

* cited by examiner

*Primary Examiner* — William Cheung
(74) *Attorney, Agent, or Firm* — Ottesen P.A.

(57) ABSTRACT

A sulfur-crosslinkable rubber mixture which, for improved abrasion characteristics with no significant deterioration in rolling resistance and in wet grip, comprises at least one functionalized diene rubber, the functionalization of which is along the polymer chain and/or at the end and enables attachment to fillers, the diene rubber having a glass transition temperature $T_g$ of −110 to −15° C., at least one aliphatic and/or aromatic hydrocarbon resin with a softening point (ring and ball to ASTM E 28) of 50 to 150° C. and a mean molecular weight $M_n$ of 200 to 2000 g/mol, and a polydispersity $D=M_w/M_n$ of 1 to 5, and at least one filler.

13 Claims, No Drawings

SULFUR-CROSSLINKABLE RUBBER MIXTURE

CROSS REFERENCE TO RELATED APPLICATIONS

This application is a continuation application of international patent application PCT/EP 2010/069438, filed Dec. 13, 2010, designating the United States and claiming priority from European application 10153826.2, filed Feb. 17, 2010, and the entire content of both applications is incorporated herein by reference.

FIELD OF THE INVENTION

The invention relates to a sulfur-crosslinkable rubber mixture comprising at least one diene rubber, at least one resin, and at least one filler. The invention further relates to a tire of which the tread is composed at least to some extent of a sulfur-vulcanized rubber mixture.

BACKGROUND OF THE INVENTION

The running properties of a tire, in particular a pneumatic tire, are greatly dependent on the rubber composition of the tread, and particularly stringent requirements are therefore placed upon the composition of the tread mixture. A great many different attempts have therefore been made to achieve favorable effects on the properties of the tire by varying the polymer components and the fillers in the tread mixture. A factor which has to be taken into account here is that an improvement in one of the properties of a tire is often attended by impairment of another property. Among the interdependent properties where improvement in one property is usually attended by impairment of at least one other property is the trio of abrasion, rolling resistance, and wet adhesion.

U.S. Pat. No. 6,136,943 has already disclosed a method for improving the abrasion performance and the wet adhesion of a pneumatic tire, where the rubber mixture for the tread comprises from 50 to 90 phr of a rubber with glass transition temperature $T_g$ of from −110 to −80° C., from 10 to 50 phr of a rubber with glass transition temperature $T_g$ of from −79 to +20° C., and from 15 to 50 phr of a resin selected from the group consisting of hydrocarbon resins, phenol/acetylene resins, colophony-derived resins, and mixtures of these.

U.S. Pat. No. 7,084,228 B2 discloses the use of resins in the tread mixture in combination with from 40 to 100 phr of a diene elastomer with glass transition temperature $T_g$ of from −65 to −10° C., and from 0 to 60 phr of a diene elastomer with glass transition temperature $T_g$ of from −110 to −80° C., for improving the abrasion performance of pneumatic tires.

Again, United States patent application publication 2004/0092644 and United States patent application publication 2004/0122157 have already disclosed the combination of specific resins with rubbers with low glass transition temperatures $T_g$ in tire tread mixtures for reducing abrasion in pneumatic tires.

The abovementioned citations use polybutadiene as diene elastomer with glass transition temperature $T_g$ of from −110 to −80° C. The citations do not disclose specific functionalized rubber types.

SUMMARY OF THE INVENTION

The invention is based on the object of providing a rubber mixture which, when used as tire tread, provides improved abrasion performance without significant impairment of rolling resistance and of wet adhesion.

The invention achieves the object in that the rubber mixture comprises
- at least one functionalized diene rubber, the functionalization of which is present along the polymer chain and/or at the end, and permits coupling to fillers, where the glass transition temperature $T_g$ of the diene rubber is from −110 to −15° C.,
- at least one aliphatic and/or aromatic hydrocarbon resin with a softening point (ring and ball in accordance with ASTM E28) of from 50 to 150° C. and with an average molar mass $M_n$ of from 200 to 2000 g/mol, and also with a polydispersity $D=M_w/M_n$ of from 1 to 5, and
- at least one filler.

The specific combination of at least one functionalized diene rubber, which can be bonded to a filler and which has a low glass transition temperature, with at least one specific resin with the abovementioned properties, and filler, permits achievement of a marked improvement in the abrasion performance of a tread mixture. This is not a foreseeable result because an addition of resins, of course, softens a mixture. At the same time, wet adhesion and rolling resistance remain at a high level. In addition, it has also been found that the ultimate-tensile properties of the mixtures are also improved.

Functionalized diene rubbers that can be used are any of the diene rubbers known to the person skilled in the art. Among these diene rubbers are all of the rubbers having an unsaturated carbon chain which derive at least to some extent from conjugated dienes, for example polyisoprenes, styrene-butadiene copolymers, polybutadienes, isoprene-butadiene copolymers, or styrene-isopropene-butadiene copolymers. However, it is particularly advantageous in respect of the improvement in abrasion performance to use at least one functionalized solution-polymerized styrene-butadiene copolymer (SSBR). However, the mixture can also comprise a plurality of functionalized solution-polymerized styrene-butadiene copolymers (SSBR).

In one preferred embodiment of the invention, the rubber mixture comprises from 10 to 100 phr, preferably from 30 to 100 phr, of the functionalized diene rubber.

The quantifier phr (parts per hundred parts of rubber by weight) used in this disclosure is the conventional quantitative measurement for mixture formulations in the rubber industry. The amount added in parts by weight of the individual substances here is always based on 100 parts by weight of the entire composition of all of the rubbers present in the mixture.

The sulfur-crosslinkable rubber mixture can comprise other non-functionalized diene rubbers alongside the functionalized diene rubbers. It is particularly preferable that the diene rubber(s) has/have been selected from the group consisting of natural rubber (NR), synthetic polyisoprene (IR), polybutadiene (BR), and styrene-butadiene copolymer (SBR). The diene elastomers give good results in processing to give the rubber mixture of the invention, and provide good tire properties in the vulcanized tires.

The rubber mixture can comprise polyisoprene (IR, NR) as diene rubber. This can be either cis-1,4-polyisoprene or 3,4-polyisoprene. However, it is preferable to use cis-1,4-polyisoprenes having >90% by weight cis-1,4 content. Firstly, this type of polyisoprene can be obtained by stereospecific polymerization in solution with Ziegler-Natta catalysts, or with use of finely dispersed alkyllithium compounds. Secondly, natural rubber (NR) is a cis-1,4-polyisoprene of this type, the cis-1,4 content in natural rubber being greater than 99% by weight.

If the rubber mixture comprises polybutadiene (BR) as diene rubber, this can be either cis-1,4-polybutadiene or vinylpolybutadiene (from 10 to 90% by weight vinyl content). It is preferable to use cis-1,4-polybutadiene which has more than 90% by weight cis-1,4 content and which can be produced by way of example by solution polymerization in the presence of catalysts of the rare-earth type.

The styrene-butadiene copolymer can be solution-polymerized styrene-butadiene copolymer (SSBR) which has a styrene content, based on the polymer, of about 10 to 45% by weight, and a vinyl content (content of 1,2-bonded butadiene, based on the entire polymer) of from 10 to 70% by weight, and which can be produced by way of example by using alkyllithium compounds in organic solvent. The SSBR can also be materials that have undergone coupling processes and end-group-modification. However, it is also possible to use emulsion-polymerized styrene-butadiene copolymer (ESBR), and also mixtures of ESBR and SSBR. The styrene content of the ESBR is about 15 to 50% by weight, and the types known from the prior art, which were obtained by copolymerization of styrene and 1,3-butadiene in aqueous emulsion, can be used.

However, the mixture can also comprise, in addition to the diene rubbers mentioned, other rubber types, for example, styrene-isoprene-butadiene terpolymer, isoprene-butadiene copolymer, butyl rubber, halobutyl rubber, or ethylene-propylene-diene rubber (EPDM).

With respect to wet grip and rolling resistance, it has proven particularly advantageous for the rubber mixture to comprise at least two diene rubbers of which at least one is functionalized, where the glass transition temperature $T_g$ of one diene rubber is from −50 to −15° C. and the glass transition temperature $T_g$ of another diene rubber is from −110 to −50° C. Diene rubbers that can be used here are the diene rubbers already mentioned above.

It is possible here firstly that the diene rubber with glass transition temperature $T_g$ of from −50 to −15° C. has been functionalized. Possible combinations here by way of example are those of a functionalized SSBR with glass transition temperature $T_g$ of from −50 to −15° C. and of a non-functionalized polybutadiene with glass transition temperature $T_g$ of from −110 to −50° C.

It is secondly also possible that the second diene rubber with glass transition temperature $T_g$ of from −110 to −50° C. has the functionalization which permits coupling to fillers. It is possible here by way of example to combine a non-functionalized SSBR or ESBR with glass transition temperature $T_g$ of from −50 to −15° C. with a functionalized SSBR with glass transition temperature $T_g$ of from −110 to −50° C. It is preferable that both diene rubbers have been functionalized, so that the rubber mixture can by way of example comprise two different types of functionalized SSBR, one with glass transition temperature $T_g$ of from −110 to −50° C., and one with glass transition temperature $T_g$ of from −50 to −15° C.

In order to obtain the advantageous results in relation to abrasion, it is important that the diene rubber has, along the polymer chain and/or at the end of the chain, functionalization which permits coupling to fillers. If carbon black is present as filler in the mixture, the functionalization can by way of example involve amine groups. However, particularly good abrasion performance together with low rolling resistance is achieved when the rubber mixture comprises a polar filler, and the functionalized diene rubber has been functionalized with at least one group selected from hydroxy, carboxy, amino, phthalocyanine, epoxy, silyl, silanol, siloxane, and/or aminosiloxane groups. The functionalized diene rubbers can accordingly also have a plurality of different functionalities.

The rubber mixture comprises at least one aliphatic and/or aromatic hydrocarbon resin with softening point (ring and ball in accordance with ASTM E28) of from 50 to 150° C. and with an average molar mass $M_n$ of from 200 to 2000 g/mol, and also with a polydispersity $D=M_w/M_n$ of from 1 to 5. However, it is also possible to use a plurality of resins in the mixture.

It is preferable that the aliphatic and/or aromatic hydrocarbon resin has been selected from the group consisting of terpene resins, $C_5$-resins, $C_9$-resins, cumarone-indene resins, and dicyclopentadiene (DCPD) resins, aromatic resin produced from α-methylstyrene, and copolymers of the monomers of said resin types. Resins which are not suitable in the invention are polar resins, such as phenolic resins, which do not provide any abrasion improvement.

$C_5$-resins and $C_9$-resins are hydrocarbon resins which are based on different $C_5$-monomers and $C_9$-monomers, respectively.

In one preferred embodiment of the invention, aliphatic and/or aromatic hydrocarbon resin involves a $C_5$-resin. Very good ultimate tensile properties can be achieved with this resin type.

The rubber mixture can comprise, as fillers, a very wide variety of fillers known to the person skilled in the art, for example, carbon black, silica, aluminosilicates, chalk, starch, magnesium oxide, titanium dioxide, or rubber gels.

If silica is used as filler, the amounts used are preferably from 10 to 150 phr. The silicas can involve the silicas conventional in tire rubber mixtures. It is particularly preferable to use finely dispersed, precipitated silica which has a nitrogen surface area (BET surface area) (in accordance with DIN 66131 and 66132) of from 35 to 350 m²/g, preferably from 145 to 270 m²/g, and a CTAB surface area (in accordance with ASTM D3765) of from 30 to 350 m²/g, preferably from 100 to 285 m²/g. Silicas of this type give particularly good physical properties of the vulcanizates in, for example, rubber mixtures for tire treads. Advantages can also be obtained in the processing of the mixture through a reduction in mixing time for identical product properties, giving improved productivity. Silicas that can be used are therefore by way of example not only VN3 (trade name) from Degussa but also high-dispersibility silicas, known as HD silicas (for example, Ultrasil 7000 from Degussa).

In order to improve processability, and for coupling of the silica and of other optionally present polar fillers to the diene rubber, silane coupling agents can be used in rubber mixtures. The silane coupling agents react with surface silanol groups of the silica or with other polar groups, during the mixing of the rubber or of the rubber mixture (in situ) or even before addition of the filler to the rubber in the event of pretreatment (premodification). Silane coupling agents that can be used here are any of the silane coupling agents known to the person skilled in the art for use in rubber mixtures. Coupling agents of this type known from the prior art are bifunctional organosilanes which have, as leaving group on the silicon atom, at least one alkoxy, cycloalkoxy, or phenoxy group, and which have, as other functionality, a group which optionally after cleavage can enter into a chemical reaction with the double bonds of the polymer. The last-mentioned group can by way of example involve the following chemical groups: —SCN, —SH, —NH$_2$, or —S$_x$— (where x=2-8). Examples of silane coupling agents that can be used are therefore 3-mercaptopropyltriethoxysilane, 3-thiocyanatopropyltrimethoxy-silane, or 3,3′-bis(triethoxysilylpropyl)polysulfides having from 2 to 8 sulfur atoms, e.g. 3,3′-bis(triethoxysilylpropyl) tetrasulfide (TESPT), the corresponding disulfide, or else mixtures of the sulfides having from 1 to 8 sulfur atoms with different contents of the various sulfides. TESPT here can by way of example also be added in the form of mixture with industrial carbon black (trade name X50S from Degussa). It is also possible to use, as silane coupling agent, the capped mercaptosilanes known by way of example from WO 99/09036. Moreover, it is possible to use the silanes described in U.S. Pat. Nos. 7,968,633; 7,968,636; 7,968,635; and, 7,968,634. It is possible to use, by way of example, silanes marketed as NXT in various variants by Momentive Performance Materials, USA, or those marketed as VP Si 363 from Evonik Industries, Germany.

The amounts used of the silane coupling agents are from 0.2 to 30 parts by weight, preferably from 1 to 15 parts by weight, based on 100 parts by weight of filler, in particular silica, because an optimum coupling of the filler to the rubber(s) can then be achieved.

The rubber mixture can also comprise, in addition to the substances mentioned, other additives, for example, plasticizers (for example, aromatic, naphthenic, or paraffinic mineral oil plasticizers, MES (mild extraction solvate), RAE oils, TDAE (treated distillate aromatic extract), oils based on renewable raw materials (for example, rapeseed oil or factices), the materials known as BTL oils (as disclosed in the application with application number DE 10 2008 035 962.9), or liquid polymers (for example, liquid polybutadiene)).

The rubber mixture of the invention can moreover comprise the usual parts by weight of conventional additives. Among the additives are antioxidants, for example, N-phenyl-N'-(1,3-dimethylbutyl)-p-phenylenediamene (6PPD), N-Isopropyl-N'-phenyl-p-phenylenediamine (IPPD), 2,2,4-trimethyl-1,2-dihydroquinoline (TMQ), and other substances such as those described in J. Schnetger, Lexikon der Kautschuktechnik [Encyclopedia of rubber technology], 2nd edition, Hüthig Buch Verlag, Heidelberg, 1991, pp. 42-48, activators, for example, fatty acids (for example, stearic acid), waxes, resins, and mastication aids, such as 2,2'-dibenzamidodiphenyl disulfide (DBD).

The vulcanization process is carried out in the presence of sulfur or of sulfur donors, and some sulfur donors here can simultaneously act as vulcanization accelerators. The amounts of sulfur or of sulfur donors added to the rubber mixture in the final mixing step are those familiar to the person skilled in the art (from 0.4 to 4 phr, preferred amounts of sulfur being from 1.5 to 2.5 phr).

The rubber mixture can moreover comprise conventional amounts of vulcanization accelerators, vulcanization retarders, and vulcanization activators, as vulcanization-affecting substances to control the time required and/or the temperature required for the vulcanization process, and to improve the properties of the vulcanizate. The vulcanization accelerators here can by way of example be those selected from the following accelerator groups: thiazole accelerators, for example, 2-mercaptobenzothiazol, sulfenamide accelerators, for example, benzothiazyl-2-cyclohexylsulfenamide (CBS), guanidine accelerators, for example, N,N'-diphenylguanidine (DPG), dithiocarbamate accelerators, for example, zinc dibenzyldithiocarbamate, disulfides, thiophosphates, and thiuram accelerators. The accelerators can also be used in combination with one another, with possible resultant synergistic effects.

The rubber mixture of the invention is produced conventionally; the method here generally begins by producing a parent mixture which comprises all of the constituents except the vulcanization system (sulfur and substances that affect vulcanization), in one or more mixing stages, and the finished mixture is then produced by addition of the vulcanization system. The mixture is then further processed, for example, by an extrusion procedure, and converted to the appropriate form. The mixture is preferably converted to the form of a tread. A green tread mixture thus produced is applied in a known manner during the production of the green tire, in particular green pneumatic tire. However, the tread can also be wound in the form of a narrow strip of rubber mixture onto a green tire which by this stage comprises all of the tire components except for the tread. The tires thus produced using the mixture of the invention have high durability.

DESCRIPTION OF THE PREFERRED EMBODIMENTS OF THE INVENTION

Comparative and inventive examples, which will now be used to provide further explanation of the invention, have been collated in Table 1.

In all of the mixing examples in the tables, the amounts are parts by weight, based on 100 parts by weight of total rubber (phr). The comparative mixtures are indicated by C; the inventive mixtures are indicated by I. Mixture 1(C) is a conventional tire tread mixture which serves as reference. In mixtures 3(I) and 5(I), resin replaces plasticizer. In the case of mixture 3(I) both diene rubbers used have been functionalized with OH groups, but in the case of the mixture 5(I) only the SSBR has been functionalized, and the polybutadiene has not been functionalized.

Mixture production took place under conventional conditions in a plurality of stages in a laboratory-scale tangential mixer. Test specimens were produced from all of the mixtures by 20 minutes of vulcanization under pressure at 160° C., and said test specimens were used in the test methods stated below to determine properties which are typical for the rubber industry.

Shore A hardness at room temperature in accordance with DIN 53 505

Rebound resilience at room temperature and 70° C. in accordance with DIN 53 512

Tensile strength at room temperature in accordance with DIN 53 504

Elongation at break at room temperature in accordance with DIN 53 504

Modulus at 50 and 300% elongation at room temperature in accordance with DIN 53 504

Abrasion at room temperature in accordance with DIN 53 516

TABLE 1

| | Unit | 1(C) | 2(C) | 3(I) | 4(C) | 5(I) |
|---|---|---|---|---|---|---|
| Constituents | | | | | | |
| Natural rubber | phr | 15 | 15 | 15 | 15 | 15 |
| Polybutadiene$^a$ | phr | 0 | 0 | 0 | 25 | 25 |
| SSBR 1$^b$ | phr | 65 | 30 | 30 | 60 | 60 |
| SSBR 2$^c$ | phr | 20 | 55 | 55 | 0 | 0 |
| Plasticizer oil | phr | 28 | 28 | 8 | 28 | 8 |
| N121 carbon black | phr | 5 | 5 | 5 | 5 | 5 |
| Silica$^d$ | phr | 95 | 95 | 95 | 95 | 95 |
| C$_5$-resin$^e$ | phr | 0 | 0 | 20 | 0 | 20 |
| Antioxidant | phr | 5.8 | 5.8 | 5.8 | 5.8 | 5.8 |
| Antiozonant wax | phr | 1.5 | 1.5 | 1.5 | 1.5 | 1.5 |
| Zinc oxide | phr | 2 | 2 | 2 | 2 | 2 |
| Stearic acid | phr | 1 | 1 | 1 | 1 | 1 |
| Processing aid | phr | 3 | 3 | 3 | 3 | 3 |
| Silane coupling agent | phr | 7 | 7 | 7 | 7 | 7 |
| Accelerator | phr | 4.1 | 4.1 | 4.1 | 4.1 | 4.1 |
| Sulfur | phr | 1.8 | 1.8 | 1.8 | 1.8 | 1.8 |
| Properties | | | | | | |
| Shore A hardness at RT | Shore A | 69.3 | 69.1 | 70.1 | 70.5 | 70.5 |
| Rebound resilience at RT | % | 22.7 | 30.3 | 22.6 | 27.2 | 18.9 |
| Rebound resilience at 70° C. | % | 42.7 | 47.5 | 45.5 | 45.8 | 40.4 |

TABLE 1-continued

|  | Unit | 1(C) | 2(C) | 3(I) | 4(C) | 5(I) |
|---|---|---|---|---|---|---|
| Tensile strength at RT | MPa | 16.3 | 16.4 | 18.0 | 16.4 | 17.8 |
| Elongation at break at RT | % | 482 | 431 | 457 | 466 | 500 |
| 50% modulus | MPa | 1.3 | 1.5 | 1.5 | 1.4 | 1.5 |
| 300% modulus | MPa | 9.9 | 11.3 | 11.6 | 10.4 | 10.4 |
| Abrasion | mm$^3$ | 124 | 70 | 70 | 114 | 104 |

[a] High-cis polybutadiene, not functionalized, $T_g = -105°$ C.
[b] Solution-polymerized styrene-butadiene copolymer, styrene content: 21% by weight, vinyl content about 61%, functionalized with hydroxy groups, $T_g = -25°$ C., Nipol NS 616, ZEON Deutschland GmbH
[c] Solution-polymerized styrene-butadiene copolymer, styrene content: 15% by weight, vinyl content about 25%, functionalized with hydroxy groups, $T_g = -65°$ C., Nipol NS 612, ZEON Deutschland GmbH
[d] Zeosil ® 1165 MP, Rhodia GmbH
[e] Aliphatic $C_5$-resin, softening point about 100° C., $M_n = 1200$ g/mol, D = 2.9, Escorez 1102, ExxonMobil Central Europe Holding GmbH From Table 1 it can be seen that the addition of $C_5$-resin to mixture 3(I) does not lead to any abrasion impairment conventionally to be expected; instead, abrasion remains at a very low level. In the case of mixture 5(I), abrasion performance actually improves in comparison with mixture 4(C) without resin. At the same time, however, rebound resilience at room temperature for mixture 3(I) is at the level of the reference mixture 1(C), and that of mixture 5(I) is actually lower than that; low rebound resilience at room temperature serves as an indicator of good wet adhesion.

Mixture 3(I) also features low rolling resistance, reflected in high rebound resilience at 70° C. The ultimate-tensile properties of mixtures 3(I) and 5(I) of the invention are also markedly improved when comparison is made with mixtures 2(C) and 4(C), which comprise no resin.

When mixture 3(I) or 5(I) is used for the tread of a pneumatic tire, the tire accordingly exhibits good abrasion performance with low rolling resistance and good wet adhesion.

It is understood that the foregoing description is that of the preferred embodiments of the invention and that various changes and modifications may be made thereto without departing from the spirit and scope of the invention as defined in the appended claims.

What is claimed is:

1. A sulfur-crosslinkable rubber mixture, comprising
    at least one functionalized diene rubber, the functionalization of which is present along the polymer chain and/or at the end, and permits coupling to fillers, where the glass transition temperature ($T_g$) of the diene rubber is from $-110$ to $-15°$ C.,
    at least one aliphatic and/or aromatic hydrocarbon resin with a softening point (ring and ball in accordance with ASTM E28) of from 50 to 150° C. and with an average molar mass ($M_n$) of from 200 to 2000 g/mol, and also with a polydispersity $D = M_w/M_n$ of from 1 to 5, wherein the aliphatic and/or aromatic hydrocarbon resin is selected from the group consisting of terpene resins, $C_5$-resins, $C_9$-resins, cumarone-indene resins, and dicyclopentadiene (DCPD) resins, aromatic resin produced from α-methylstyrene, and copolymers of the monomers of said resin types and
    at least one filler.

2. The rubber mixture as claimed in claim 1, wherein the functionalized diene rubber(s) is/are functionalized solution-polymerized styrene-butadiene copolymer(s) (SSBR).

3. The rubber mixture as claimed in claim 1, wherein the rubber mixture comprises from 10 to 100 phr of the functionalized diene rubber(s).

4. The rubber mixture as claimed in claim 1, further comprising at least two diene rubbers of which at least one has been functionalized, where the glass transition temperature ($T_g$) of one diene rubber is from $-50$ to $-15°$ C. and the glass transition temperature ($T_g$) of another diene rubber is from $-110$ to $-50°$ C.

5. The rubber mixture as claimed in claim 4, wherein the diene rubber with glass transition temperature ($T_g$) of from $-50$ to $-15°$ C. is functionalized.

6. The rubber mixture as claimed in claim 4, wherein the diene rubber with glass transition temperature ($T_g$) of from $-110$ to $-50°$ C. is functionalized.

7. The rubber mixture as claimed in claim 1, wherein the rubber mixture comprises a polar filler, and the functionalized diene rubber has been functionalized with at least one group selected from the group consisting of hydroxy, carboxy, amino, phthalocyanine, epoxy, silyl, silanol, siloxane, and aminosiloxane groups.

8. The rubber mixture as claimed in claim 1, wherein the aliphatic and/or aromatic hydrocarbon resin is a $C_5$-resin.

9. The rubber mixture as claimed in claim 1, further comprising from 5 to 50 phr of aliphatic and/or aromatic hydrocarbon resin.

10. The rubber mixture as claimed in claim 7, further comprising from 10 to 150 phr of silica.

11. A tire of which the tread is composed at least to some extent of a sulfur-vulcanized rubber mixture as claimed in claim 1.

12. The rubber mixture as claimed in claim 1, wherein the rubber mixture comprises from 30 to 100 phr of the functionalized diene rubber(s).

13. The rubber mixture as claimed in claim 1, further comprising from 10 to 30 phr of aliphatic and/or aromatic hydrocarbon resin.

* * * * *